United States Patent
Ho et al.

(10) Patent No.: US 7,672,273 B2
(45) Date of Patent: Mar. 2, 2010

(54) HETEROGENEOUS NETWORK TRANSMISSION APPARATUS, METHOD, AND COMPUTER READABLE MEDIUM CAPABLE OF TRANSMITTING A PACKET WITH A PLURALITY OF NETWORK PATHS ACCORDING TO AN ASSIGNMENT RATIO

(75) Inventors: Chih-Hsiang Ho, Taipei (TW); Jean-Chian Chiou, Yonghe (TW)

(73) Assignee: Institute for Information Industry, Taipei (TW)

( * ) Notice: Subject to any disclaimer, the term of this patent is extended or adjusted under 35 U.S.C. 154(b) by 402 days.

(21) Appl. No.: 11/679,045

(22) Filed: Feb. 26, 2007

(65) Prior Publication Data

US 2008/0137568 A1    Jun. 12, 2008

(30) Foreign Application Priority Data

Dec. 7, 2006    (TW) ............................... 95145696 A

(51) Int. Cl.
*H04W 4/00*    (2009.01)
(52) U.S. Cl. ...................................... 370/329; 370/341
(58) Field of Classification Search .................... None
See application file for complete search history.

(56) References Cited

U.S. PATENT DOCUMENTS

| | | | |
|---|---|---|---|
| 6,768,726 B2 | 7/2004 | Dorenbosch et al. | |
| 6,850,503 B2 | 2/2005 | Dorenbosch et al. | |
| 7,016,306 B2 * | 3/2006 | Alapuranen et al. | 370/238 |
| 7,027,389 B2 | 4/2006 | Stewart | |
| 7,051,109 B1 | 5/2006 | Stewart et al. | |
| 7,333,435 B2 * | 2/2008 | Gerkis | 370/235 |
| 7,409,450 B2 * | 8/2008 | Jorgensen | 709/226 |
| 7,424,529 B2 * | 9/2008 | Hubis | 709/224 |
| 7,505,433 B2 * | 3/2009 | Yaqub et al. | 370/400 |
| 2004/0193295 A1 | 9/2004 | Kaneko | |
| 2005/0037757 A1 * | 2/2005 | Moon et al. | 455/436 |
| 2005/0050191 A1 * | 3/2005 | Hubis | 709/223 |
| 2006/0133307 A1 * | 6/2006 | Fukasawa et al. | 370/328 |
| 2008/0031188 A1 * | 2/2008 | Magnusson et al. | 370/329 |

* cited by examiner

*Primary Examiner*—Chi H Pham
*Assistant Examiner*—Soon-Dong D Hyun
(74) *Attorney, Agent, or Firm*—Patterson, Thuente, Skaar & Christensen P.A.

(57) ABSTRACT

A heterogeneous network apparatus, method, computer program, and computer readable medium can detect path status parameters of heterogeneous networks. The path status parameters are used to calculate path priorities. The path priorities are used to determine an assignment ratio. The assignment ratio is used to assign network paths to transmit a packet, whereby the problem that the heterogeneous network apparatus of the prior art cannot utilize different network interfaces effectively at the same time is solved.

27 Claims, 8 Drawing Sheets

|  | Network Interface A | Network Interface B | Network Interface C |
|---|---|---|---|
| network interface power consumption (5) | 1(5) | 2(10) | 3(15) |
| Network Latency (4) | 1(4) | 3(12) | 2(8) |
| Network Miss Rate (3) | 2(6) | 3(9) | 1(3) |
| The Sum of Weight Value | 15 | 31 | 26 |

FIG. 5

HETEROGENEOUS NETWORK TRANSMISSION APPARATUS, METHOD, AND COMPUTER READABLE MEDIUM CAPABLE OF TRANSMITTING A PACKET WITH A PLURALITY OF NETWORK PATHS ACCORDING TO AN ASSIGNMENT RATIO

This application claims the benefit of priority based on Taiwan Patent Application No. 095145696 filed on Dec. 7, 2006 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to a network transmission apparatus, a method, and a computer readable medium thereof, specifically, it relates to a heterogeneous network transmission apparatus, a method, and a computer readable medium thereof for simultaneously transmitting data through a plurality of network paths according to an assignment ratio.

2. Descriptions of the Related Art

Since portable electronic equipments are popular and various wireless communication technologies make progress, people frequently connect to the network through the portable electronic equipments. It is not hard to imagine that having a plurality of network interfaces for connecting to the Internet in an electronic apparatus is very common. In order to appropriately use the heterogeneous network interfaces on the electronic apparatus, a general way is to adopt the stream control transmission protocol (SCTP). The SCTP is a transport layer protocol defined by SIGTRAN of IETF in 2000. In contrast to the TCP and the UDP, the SCTP uses multi-homing to achieve the objective of controlling the heterogeneous network interfaces.

FIG. 1 shows a conventional heterogeneous network transmission system 1 using the SCTP, wherein a first transceiver 10 intends to transmit data to a second transceiver 11 through the internet 12. There are a first network interface 13, a second network interface 14 and a third network interface 15 which can be selected between the first transceiver 10 and the second transceiver 12. If the first network interface 13 is selected for data transmission, the whole data has to be transmitted through the first network interface 13. If the transmission through the first network interface 13 fails, the SCTP will control the first transceiver 10 to make two duplicates of the data to be transmitted simultaneously through the second network interface 14 and the third network interface 15.

In the conventional heterogeneous network transmission system 1, although the objective of using the heterogeneous network to transmit data between the first transceiver 10 and the second transceiver 11 is achieved, the whole data can only be transmitted through one network interface. This causes other unused network interfaces idle. As described above, even two copies of the data are transmitted simultaneously through two different network interfaces, each copy as a whole must be transmitted through one of the network interfaces. The resource utilization is not efficiently. On the other hand, since portable electronic apparatuses have limited battery capacity, power consumption has to be taken into account when transmission occurs. Consequently, how to select a power-saving network interface and to efficiently utilize the resources of different network interfaces is still an object for the industry to endeavor.

SUMMARY OF THE INVENTION

One objective of this invention is to provide a heterogeneous network transmission apparatus for transmitting a packet. The heterogeneous network transmission apparatus comprises a detection module, a calculation module, an assignment module and a transmission module. The detection module is used for detecting a plurality of heterogeneous network path status parameters. The calculation module is used for calculating a plurality of heterogeneous network path priorities according to the heterogeneous network path status parameters. The assignment module is used for determining an assignment ratio according to the heterogeneous network path priorities. The transmission module is used for transmitting a first chunk of the packet according to the assignment ratio.

Another objective of this invention is to provide a heterogeneous network transmission method for transmitting a packet, comprising the following steps: detecting a plurality of heterogeneous network path status parameters; calculating a plurality of heterogeneous network path priorities according to the heterogeneous network path status parameters; determining an assignment ratio according to the heterogeneous network path priorities; and transmitting a first chunk of the packet according to the assignment ratio.

Yet a further objective of the invention is to provide a computer readable medium for storing a computer program. The computer program makes a heterogeneous network transmission apparatus execute a heterogeneous network transmission method for transmitting a packet. The method comprises the following steps: making a detection module detect a plurality of heterogeneous network path status parameters and store the plurality of heterogeneous network path status parameters into a first register; making a calculation module retrieve the heterogeneous network path status parameters from the first register to calculate a plurality of heterogeneous network path priorities according to the heterogeneous network path status parameters and to store the plurality of heterogeneous network path priorities into a second register; making an assignment module retrieve the plurality of heterogeneous network path priorities from the second register to determine an assignment ratio according to the heterogeneous network path priorities and to store the assignment ratio into a third register; and making a transmission module retrieve the assignment ratio from the third register and to transmit a first chunk of the packet according to the assignment ratio.

The invention generates an assignment ratio according to the heterogeneous network path status parameters. Data is then divided into a plurality of sub-data for simultaneously transmitting through various network interfaces according to the assignment ratio. It can solve the problem that the conventional heterogeneous network transmission apparatus can not efficiently utilize the different network interfaces.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5 is an example of calculating a priority in the first embodiment;

DESCRIPTION OF THE PREFERRED EMBODIMENT

Figure 1:
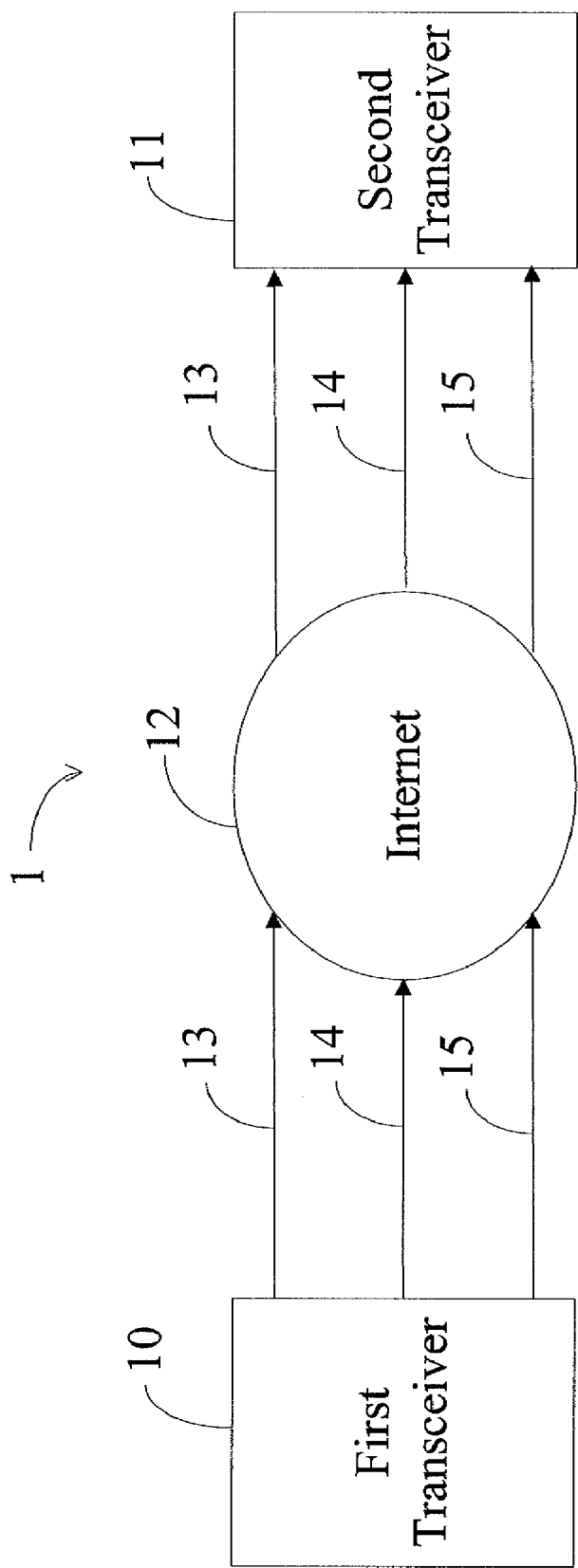
FIG. 1 is a schematic diagram of a conventional heterogeneous network transmission system.
Figure 2:
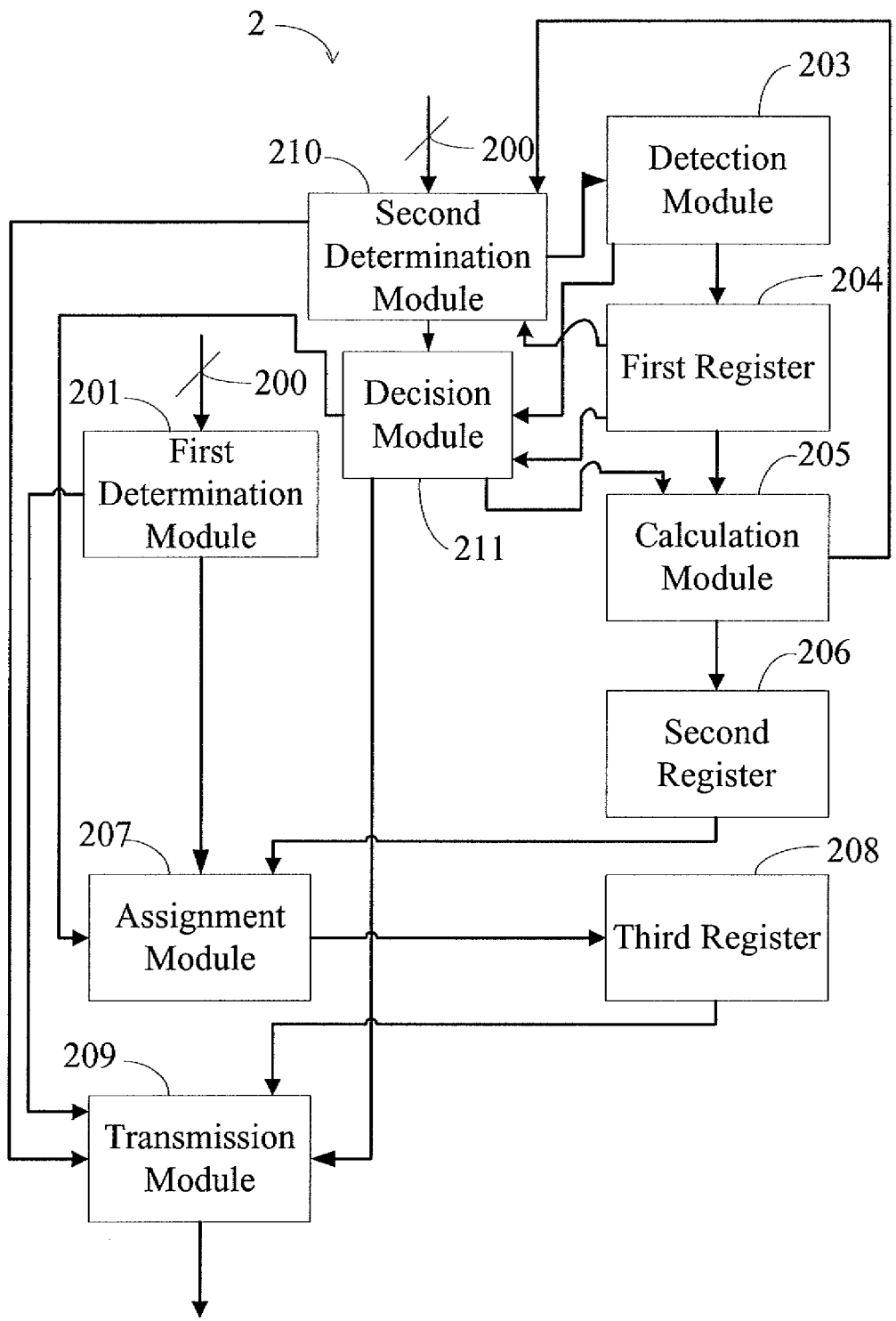
FIG. 2 is a schematic diagram of a first embodiment of the invention.

A first embodiment of the invention is shown in FIG. 2 which is a heterogeneous network transmission apparatus 2 using SCTP. The heterogeneous network transmission apparatus 2 comprises a first determination module 201, a detection module 203, a first register 204, a calculation module 205, a second register 206, an assignment module 207, a third register 208, a transmission module 209, a second determination module 210 and a decision module 211.

Figure 3:
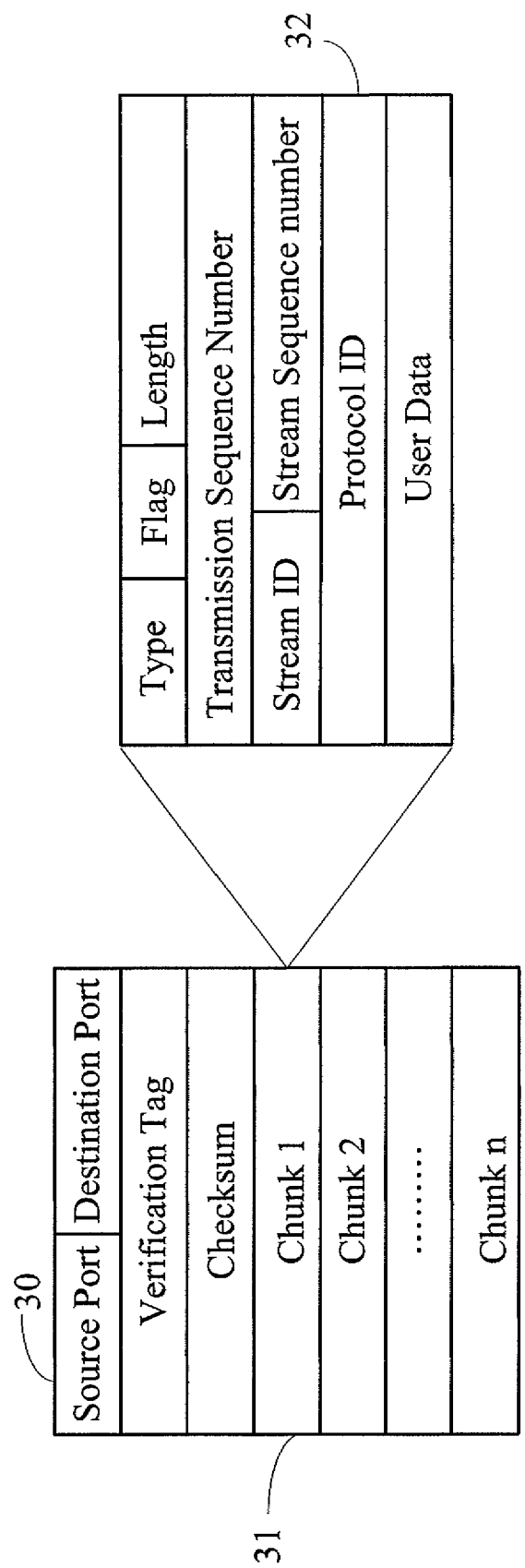
FIG. 3 is a schematic diagram of a SCTP packet specification.
Figure 4:
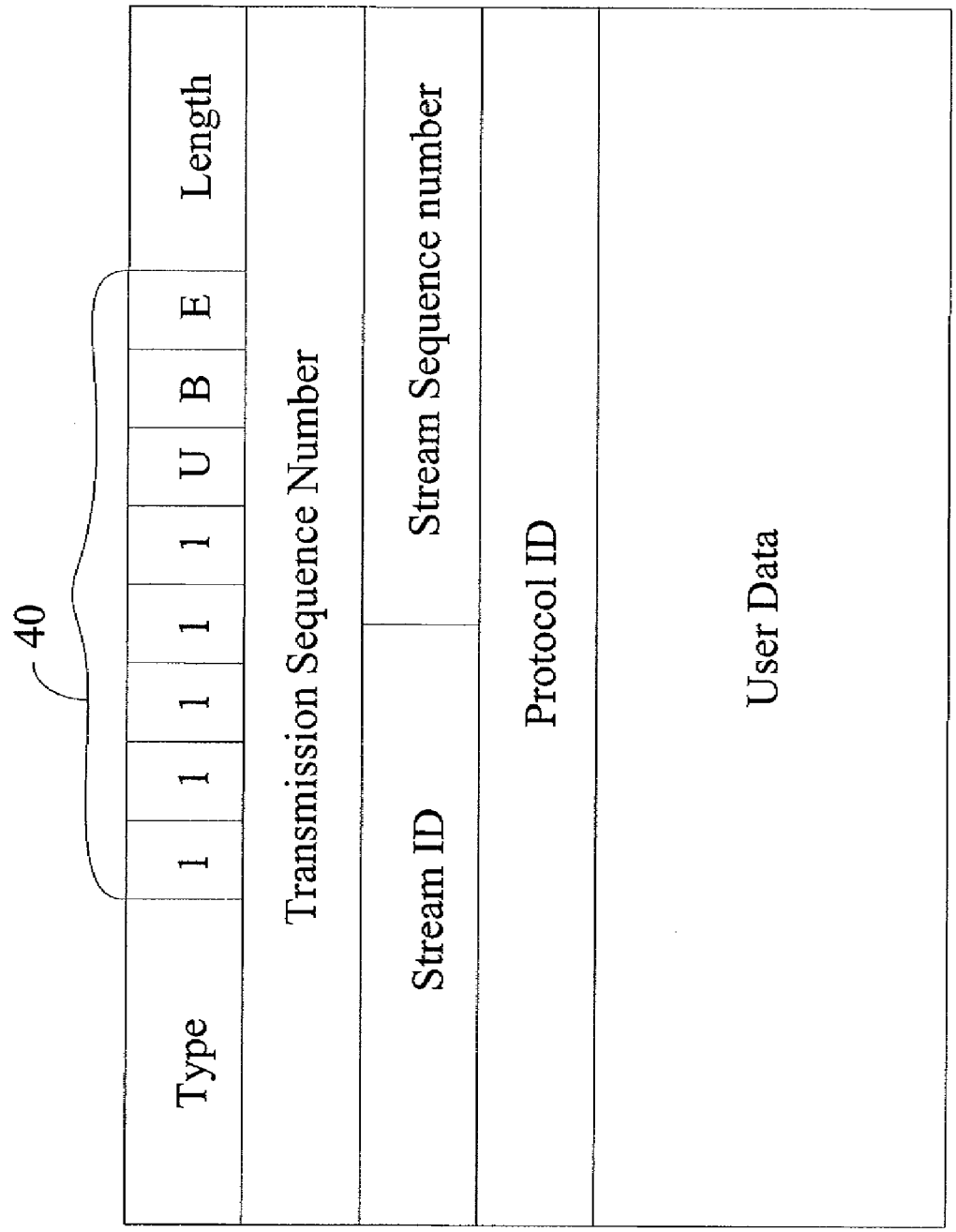
FIG. 4 is a schematic diagram of a chunk specification of a SCTP packet.

The specification of a SCTP packet is shown in FIG. 3. The SCTP packet comprises a plurality of chunks whose specification is shown in FIG. 4. A chunk flag 40 has 8 bits with the most significant 5 bits as reserved bits. In this embodiment, these reserved bits are used to determine whether the invention can be applied. For example, when the heterogeneous network transmission apparatus 2 receives a packet with all the reserved bits being 1, it will handle the packet in accordance with the invention. Otherwise, it will handle the packet in the conventional way. Please refer back to FIG. 2. When there is a packet 200 required for transmission in an application layer, the packet 200 will be transmitted to the first determination module 201 first to determine whether all the reserved bits are 1. If not, the conventional way is adopted to transmit the packet 200. If yes, a source port 30 of the packet 200 or a protocol identification 32 of a first chunk 31 is retrieved to classify the packet 200. Categories of the packet 200 are defined as a reliable packet, an ordered packet, a partial reliable packet, a partial ordered packet, an unreliable packet, and an unordered packet, etc. These packet categories are defined in the SCTP specification. Therefore, the first determination module 201 determines which category the packet 200 is. Its major objective is to analyze the packet 200 and to classify it according to its application. Such a categorization assigns an appropriate priority to the packet 200 according to a predetermined policy. Once bandwidth resources are limit, the packet 200 will be scheduled for transmission based on its priority. For example, in the application of VoIP, the packet sequence has higher priority than reliability, and, in the application of FTP, reliability is much more important than sequence. If we use these two applications in the heterogeneous network transmission apparatus 2 simultaneously, the predetermined policy helps to decide the priority. The predetermined policy is made by users and recorded in a user profile. The aforementioned categories are not a limitation to the scope of the invention.

The detection module 203 is configured to continuously detect a plurality of heterogeneous network interface status parameters and to store the detection results into the first register 204. The status parameters may related to one of latency, miss rate, power consumption, and other parameters capable of assessing network QoS status, or a combination thereof. The status parameters can be derived based on the current techniques which are well-known to those skilled in the art.

Next, the calculation module 205 retrieves the heterogeneous network interface status parameters, namely first status parameters, from the first register 204 to calculate a plurality of heterogeneous network path priorities. Here is an example of calculating a priority in the first embodiment. As shown in FIG. 5, assume that the heterogeneous network transmission apparatus 2 has three different heterogeneous network interfaces A, B and C. The considered heterogeneous network interface status parameters in this embodiment are the network latency, the network miss rate, and the network power consumption. The heterogeneous network interface status parameters are pre-set weights according to its importance in the application. In this embodiment, the weight of the network interface power consumption is 5, the weight of the network latency is 4, and the weight of the network miss rate is 3. The numbers of the weights express that the network interface power consumption is the most important, and the network latency is second, and the network miss rate is the last. The network power consumption in the network interface A is assumed the most among the three network interfaces so the corresponding status parameter is marked as 1 by the detection module 203. The calculation module 205 multiplies the status parameter, 1, by the weight, 5, so a weight value, 1×5=5, for the network power consumption in the network interface A is derived. The network power consumption in the network interface B is assumed in the second place among the three network interfaces so the corresponding status parameter is marked as 2 by the detection module 203. The calculation module 205 multiplies the status parameter, 2, by the weight, 5, so a weight value, 2×5=10, for the network power consumption in the network interface B is derived. The network power consumption in the network interface C is assumed the last among the three network interfaces so the corresponding status parameter is marked as 3 by the detection module 203. The calculation module 205 multiplies the status parameter, 3, by the weight, 5, so a weight value, 3×5=15, for the network power consumption in the network interface C is derived. Similarly, a weight value of the network latency in the network interface A is 4, a weight value of the network latency in the network interface B is 12, a weight value of the network latency in the network interface C is 8, a weight value of the network miss rate in the network interface A is 6, a weight value of the network miss rate in the network interface B is 9, and a weight value of the network miss rate in the network interface C is 3. The calculation module 205 then accumulates the weight values of each of the network interfaces A, B and C to obtain sums 15, 31 and 26, respectively. Since the network interface B has the best performance as a whole, the network interface B is set to the highest priority. The network interface C is next, and the network interface A has the lowest priority. These priorities are stored into a second register 206. Although the first embodiment uses the table in FIG. 5 to illustrate how to derive the priorities for three heterogeneous network interfaces, the number of the heterogeneous network interfaces and the considered status parameters can be various depending on practical needs. The QoS parameters in the table are not used to limit the scope of the invention.

The assignment module 207 retrieves the heterogeneous network path priorities from the second register 206 to determine assignment ratios. For example, the assignment ratios for the network interfaces A, B and C are 15/(15+31+26)=20%, 31/(15+31+26)=45%, and 26/(15+31+26)=35%, respectively.

After the assignment module 207 determines the assignment ratios for the network interfaces A, B and C, they are stored into a third register 208. The transmission module 209 retrieves the assignment ratios from the third register 208 and transmits the first chunk of the packet 200 according to the assignment ratios. More specifically, since the assignment ratios of the heterogeneous network interface A, B, and C are 20%, 45%, and 35%, the first chunk is divided into three parts in to the assignment ratios and each part is transmitted through the corresponding network interface simultaneously.

After the first chunk is processed, the transmission of the next chunk, such as a second chink, is now handled. The second determination module 210 retrieves heterogeneous network interface status parameters at this time, second status parameters, and the first status parameters from the first register 204 to determine whether the assignment ratios need to be adjusted.

Figure 6:
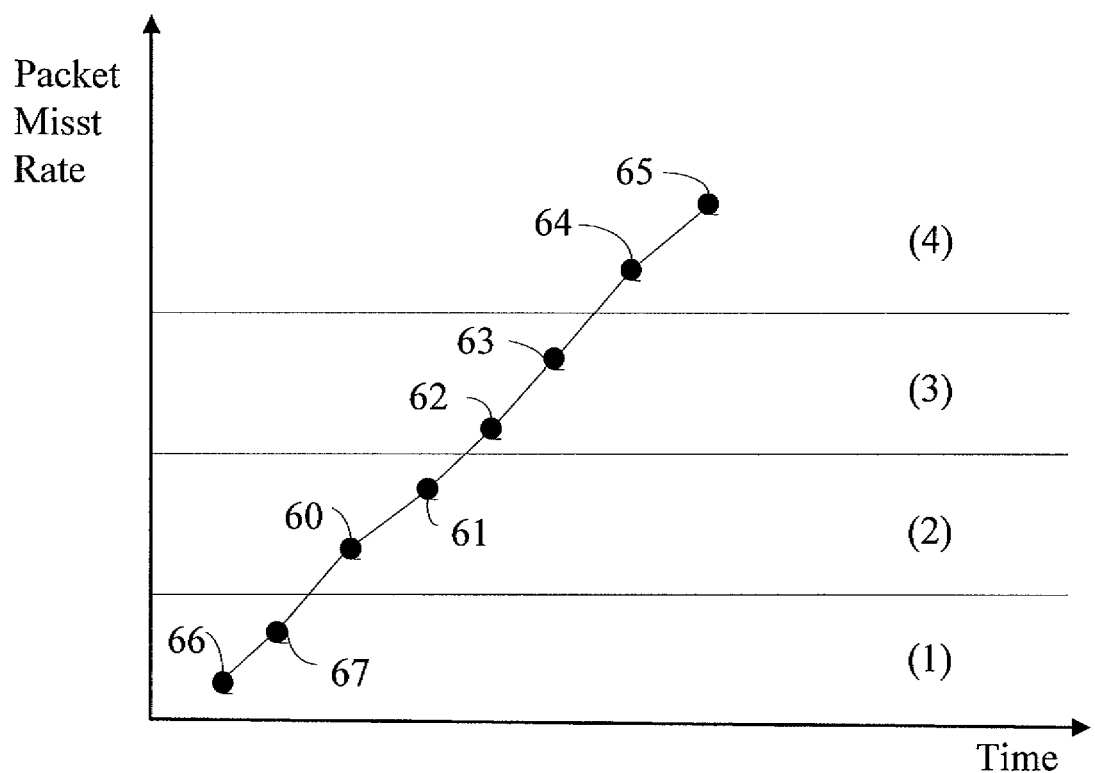
FIG. 6 is a schematic diagram of how to determine whether an assignment ratio requires to be adjusted in the first embodiment.

FIG. 6 shows how the second determination module 210 determines whether the assignment ratios need to be adjusted, wherein the y axis represents a measured value of one of the heterogeneous network interface status parameters, and the x axis is time. For the sake of simplification, the packet miss rate of transmitting through the heterogeneous network interface B is exemplary in FIG. 5. The first embodiment defines three threshold values for the packet miss rate: a slight threshold value, a coarse threshold value, and an error threshold value. When the measured value of the packet miss rate is less than the slight threshold value (zone 1), such as points 66 and 67, it means that the first status parameters are good enough to represent the interface statuses at the moment for transmitting the second chuck, and thus the assignment ratios do not require to be adjusted. The second determination module 210 informs the transmission module 209 to transmit the second chunk according to the existing assignment ratios in the third register 208 directly.

If the measured value of the packet miss rate is located between the slight threshold value and the coarse threshold value (zone 2), such as points 60 and 61, the second determination module 210 transmits a determination result to the decision module 211. The decision module 211 instructs the calculation module 205 to divide zone 2 into 100 equal parts and to transfer the measured value in percentage. For example, if the coarse threshold value is 10, the slight threshold value is 5, and the measured value is 7, then the percentage number is (7−5)/(10−5)×100%=40%. Referring back to FIG. 5, the weight of the packet miss rate in the network interface B is 9. Therefore, the weight is adjusted to 9−(9×40%)=5.4. The priorities are then updated according to the adjusted weight and stored to the second register 206.

The assignment module 207 retrieves the updated heterogeneous network path priorities from the second register 206 to adjust the assignment ratios. The calculation for deriving the assignment ratios is the same as aforementioned. The adjusted assignment ratios are updated to the third register 208. The transmission module 209 assigns the heterogeneous transmission paths to transmit the second chunk of the packet according to the adjusted assignment ratios stored in the third register 208.

If the measured value is located between the coarse threshold value and the error threshold value (zone 3), such as points 62 and 63, it means that the second status parameter of the packet miss rate is quite different from the first status parameter so these first status parameters are not suitable as reference to determine the assignment ratios for the second chuck.

The decision module 211 instructs the calculation module 205 to re-calculate the weight for the packet miss rate in the heterogeneous network interface B according to the second status parameter and the transmission packet miss rates in the heterogeneous network interfaces A and C stored in the first register 204 to re-calculate the priorities. Next, the assignment module 207 determines the assignment ratios and the transmission module 209 transmits the second chunk according to the re-calculated priorities. The operations of the assignment module 207 and the transmission module 209 are the same as aforementioned.

If the measured value is greater than the error threshold value (zone 4), such as points 64 and 65, it means that the second status parameters are hugely different from the first status parameters so that the network interface may have some problems. The decision module 211 informs the transmission module 209 to stop transmitting the second chunk through the heterogeneous network interface B. In other words, the assignment ratio of the heterogeneous network interface B is set to 0.

After the second chunk is processed, the third chunk is handled by the same process for handling the second chunk. The only difference is that the third status parameters, i.e., the status parameters detected when processing the third chunk are compared with the second status parameters. It is noted that the types of the status parameters, the ranges of the threshold values and whether to use or not are various according to practical conditions.

Figure 7A:
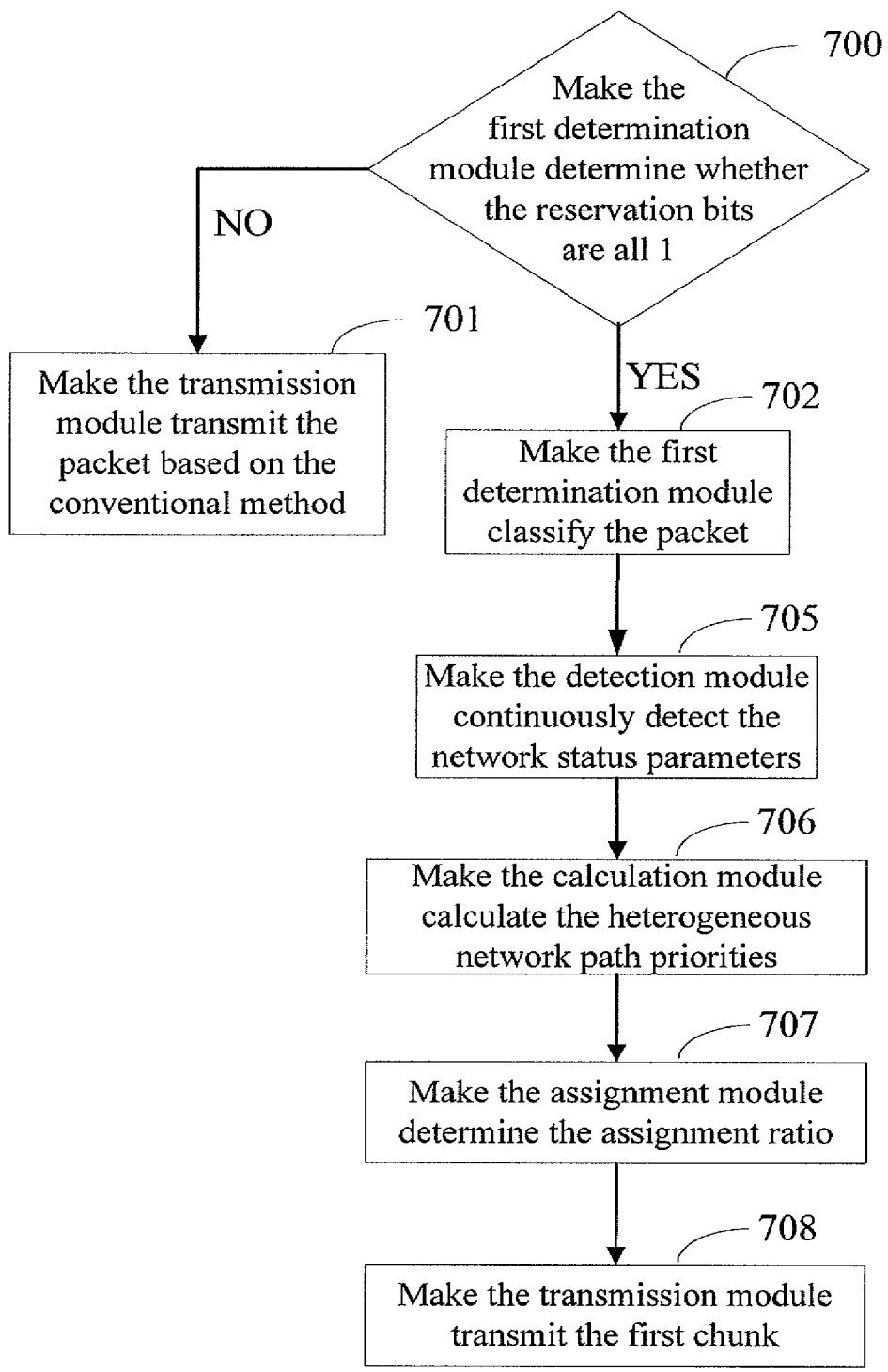
FIG. 7A is a flow chart of transmitting the first chunk of a second embodiment of the invention.
Figure 7B:
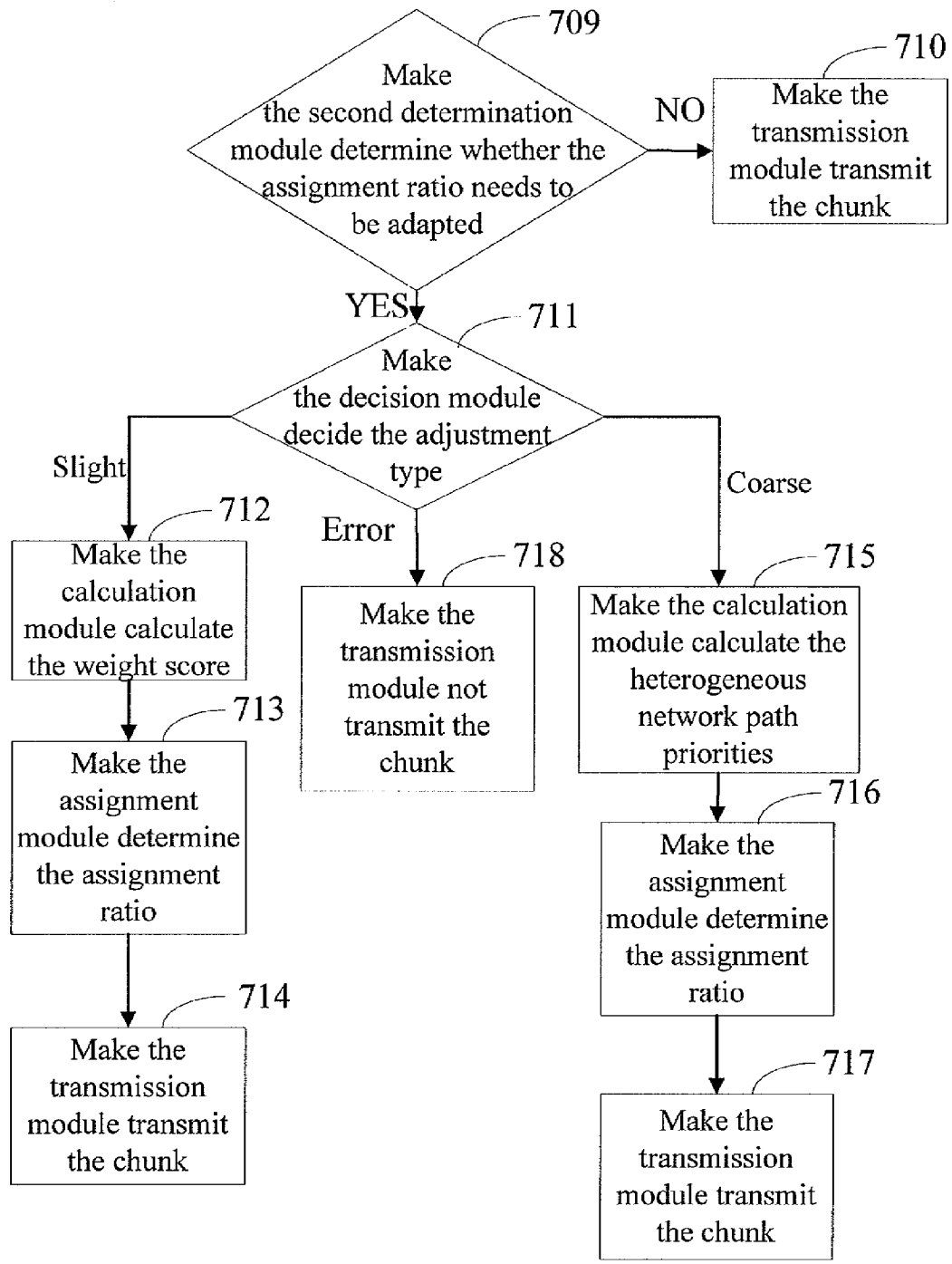
FIG. 7B is a flow chart of transmitting the chunks after the first chunk of the second embodiment of the invention.

A second embodiment of the invention is shown in FIG. 7A and FIG. 7B which is a heterogeneous network transmission method applied to a heterogeneous network transmission apparatus 2. When a packet 200 in an application layer of the network requires to be transmitted, step 700 is executed in which a first determination module 201 determines whether the reserved bits are all 1. If not, step 701 is executed in which a transmission module 209 transmits the packet 200 based on the conventional way. If yes, step 702 is executed in which the first determination module 201 classifies the packet 200 according to a source port 30 of the packet 200 or a protocol identification 32 of a first chunk 31. Categories of the packet 200 are defined as a reliable packet, an ordered packet, a partial reliable packet, a partial ordered packet, an unreliable packet, and an unordered packet, etc. These packet categories are defined in the SCTP specification. Therefore, in step 702, the first determination module 201 determines which category the packet 200 is and generates a category, wherein the functionality of the category is described as the first embodiment.

Next, step 705 is executed in which a detection module 203 continuously detects a plurality of heterogeneous network status parameters and stores the detection results to a first register 204. The status parameters may related to one of latency, miss rate, power consumption, and other parameters capable of assessing network QoS status, or a combination thereof. The status parameters can be derived based on the current techniques which are well-known to those skilled in the art.

Then step 706 is executed in which a calculation module 205 retrieves the first status parameters from the first register 204 to calculate a plurality of heterogeneous network path priorities. The calculation method is the same as the corresponding descriptions in the first embodiment. The priorities are stored to a second register 206, respectively. Next, step 707 is executed in which an assignment module 207 retrieves the heterogeneous network path priorities from the second register 206 to determine assignment ratios of the heterogeneous network paths according to the heterogeneous network path priorities, and to store the assignment ratios to a third register 208, wherein the determination method is the same as described in the first embodiment. Next, step 708 is executed in which a transmission module 209 retrieves the assignment ratios from the third register 208 to assign the heterogeneous transmission paths for transmitting the first chunk according to the assignment ratios.

After the first chunk is processed, the transmission of the next chunk, such as a second chink, is now handled. At this time, step 709 in FIG. 7B is executed in which a second determination module 210 retrieves the heterogeneous network interface status parameters, the second status parameters, and the first status parameters from the first register 204 to determine whether the assignment ratios need to be adjusted when transmitting the second chunk. The determination method is the same as described in the first embodiment.

In the second embodiment, if a measured value of the status parameters of the second chunk and a measured value of the status parameters of the first chunk do not reach a slight threshold, it means that no adjustment is required. Under such circumstances, step 710 is executed in which the transmission module 209 transmits the second chunk according to the existing assignment ratios in the third register 208 directly. However, if the measured value of the status parameters of the second chunk exceeds the slight threshold value, a further determination is required. At this time, step 711 is executed in which a decision module 211 further determines an adjustment type according to the second status parameters and the first status parameters. Similarly, there are three types for the adjustment type in the second embodiment: error, coarse and slight.

When the adjustment type is the slight type (zone 2), it means some weight represented by the status of some heterogeneous transmission path is required for adjustment. The assignment ratios for each of the heterogeneous transmission paths will be adjusted slightly accordingly. At this time, step 712 is executed in which the calculation module 205 re-calculate the weight of the status parameter of some heterogeneous transmission path, wherein the adjustment calculation method is the same as described in the first embodiment. Next, step 713 is executed in which the assignment module 207 update the assignment ratios according to the adjustment result. Finally, step 714 is executed in which the transmission module 209 assign the heterogeneous transmission paths for transmitting the second chunk according to the adjusted assignment ratios stored in the third register 208.

If the adjustment type is the coarse type (zone 3), it means that the second status parameters and the first status parameters have a large difference. Under such circumstances, steps 715, 716 and 717 are executed in which the calculation module 205 re-calculates the weights represented by the status parameters of the heterogeneous network interfaces and re-calculates priorities; the assignment module 207 re-generates new assignment ratios; and the transmission module 209 transmits the second chunk according to the adjusted assignment ratios, respectively.

If the adjustment type belongs to the error type (zone 4), the network interface may have some problems. Under such circumstances, step 718 is executed in which the transmission module 209 stop transmitting the second chunk through that failed network interface, i.e., sets the assignment ratio of some network interface to 0. Similarly, the types of the status parameters, the ranges of the threshold values and whether to use or not may be different according to various physical application conditions as described in the first embodiment.

After the second chunk is processed, the third chunk is then handled by the same process for handling the second chunk, i.e., the flow chart as shown in FIG. 7B. The only difference is that the third status parameters, status parameters of the heterogeneous network interfaces when processing the third chunk, are compared with the second status parameters. The following processes for the chunk are similar and thus not repeated here.

Besides the aforementioned steps, the second embodiment can execute all operations and methods as described in the first embodiment.

The aforementioned methods can be implemented by running a computer program. The computer program may be stored in a computer readable medium. The computer readable medium can be a floppy disk, a hard disk, an optical disc, a flash disk, a tape, a database accessible from a network or a storage medium with the same functionality that can be easily thought by those skilled in the art.

The invention can generate the assignment ratios according to the heterogeneous network path status parameters and divide the transmitted data into a plurality of sub-data for simultaneously transmitting the sub-data through various network interfaces according to the assignment ratios to solve the problem of the conventional heterogeneous network transmission apparatus that can not efficiently utilize different network interfaces (the condition also comprises using one or some of the transmission paths).

The above disclosure is related to the detailed technical contents and inventive features thereof, and it is not a limitation to the scope of the invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A heterogeneous network transmission apparatus for transmitting a packet through a plurality of network paths, comprising:
    a detection module being communicatively coupled to the network paths to detect a plurality of heterogeneous network path status parameters;
    a first register for storing the heterogeneous network path status parameters;
    a calculation module for retrieving the heterogeneous network path status parameters from the first register and calculating a plurality of heterogeneous network path priorities according to the heterogeneous network path status parameters;
    an assignment module for determining a plurality of assignment ratios according to the heterogeneous network path priorities; and
    a transmission module being communicatively coupled to the network paths to transmit a first chunk of the packet according to the assignment ratios.

2. The heterogeneous network transmission apparatus of claim 1, further comprising:
    a first determination module for determining a category of the packet according to one of a source port and a protocol identification of the packet.

3. The heterogeneous network transmission apparatus of claim 1, wherein the detection module re-detects the heterogeneous network path status parameters when a second chunk of the packet is processed, the apparatus further comprising:

a second determination module for determining whether the assignment ratio needs adjusting; and a decision module for deciding an adjustment type of the packet if the assignment ratio needs adjusting.

4. The heterogeneous network transmission apparatus of claim 3, wherein the second determination module determines whether the assignment ratios need adjusting according to the heterogeneous network path status parameters detected for the first chunk and the second chunk.

5. The heterogeneous network transmission apparatus of claim 3, wherein if the adjustment type is a coarse type, the calculation module re-calculates the heterogeneous network path priorities according to the heterogeneous network path status parameters detected for the second chunk, the assignment module re-determines the assignment ratios according to the re-calculated heterogeneous network path priorities, and the transmission module transmits the second chunk according to the re-determined assignment ratios.

6. The heterogeneous network transmission apparatus of claim 3, wherein if the adjustment type is a slight type, the calculation module re-calculates the heterogeneous network path priorities according to the heterogeneous network path status parameters, the assignment module re-determines the assignment ratios according to the re-calculated heterogeneous network path priorities, and the transmission module transmits the second chunk according to the re-determined assignment ratios.

7. The heterogeneous network transmission apparatus of claim 3, wherein if the second determination module determines that the assignment ratio does not need adjusting, the transmission module transmits the second chunk according to the assignment ratios for the first chunk.

8. The heterogeneous network transmission apparatus of claim 1, wherein the calculation module calculates a weight value according to a predetermination weight, accumulates all weight values of the heterogeneous network paths, and determines the heterogeneous network path priorities according to the accumulated weight values.

9. The heterogeneous network transmission apparatus of claim 8, wherein the assignment ratios are in direct proportion with the accumulated weight values.

10. A heterogeneous network transmission method applied to a heterogeneous network transmission apparatus for transmitting a packet through a plurality of network paths, the heterogeneous network transmission apparatus comprising a detection module, a first register, a calculation module, an assignment module and a transmission module, the detection module and the transmission module being communicatively coupled to the network paths, the heterogeneous network transmission method comprising the following steps:

causing the detection module to detect a plurality of heterogeneous network path status parameters;

causing the first register to store the heterogeneous network path status parameters;

causing the calculation module to calculate a plurality of heterogeneous network path priorities according to the heterogeneous network path status parameters;

causing the assignment module to determine a plurality of assignment ratios according to the heterogeneous network path priorities; and causing the transmission module to transmit a first chunk of the packet according to the assignment ratios.

11. The heterogeneous network transmission method of claim 10, wherein the heterogeneous network transmission apparatus further comprises a first determination module, the method further comprises a step of causing the first determination module to determine a category of the packet according to one of a source port and a protocol identification of the packet.

12. The heterogeneous network transmission method of claim 10, wherein the detection step re-detects the heterogeneous network path status parameters when a second chunk of the packet is processed, the heterogeneous network transmission apparatus further comprises a second determination module and a decision module, the method further comprising the following steps:

causing the determination module to determine whether the assignment ratio needs adjusting; and causing the decision module to decide an adjustment type of the packet if the assignment ratio needs to be adjusting.

13. The heterogeneous network transmission method of claim 12, wherein the step of determining whether the assignment ratios need adjusting determines whether the assignment ratios need adjusting according to the heterogeneous network path status parameters detected for the first chunk and the second chunk.

14. The heterogeneous network transmission method of claim 12, wherein if the adjustment type is a coarse type, the calculation step re-calculates the heterogeneous network path priorities according to the heterogeneous network path status parameters detected for the second chunk, the assignment step re-determines the assignment ratios according to the re-calculated heterogeneous network path priorities, and the transmission step transmits the second chunk according to the re-determined assignment ratios.

15. The heterogeneous network transmission method of claim 12, wherein if the adjustment type is a slight type, the calculation step re-calculates the heterogeneous network path priorities according to the heterogeneous network path status parameters, the assignment step re-determines the assignment ratios according to the re-calculated heterogeneous network path priorities, and the transmission step transmits the second chunk according to the re-determined assignment ratios.

16. The heterogeneous network transmission method of claim 12, wherein if the step of determining whether the assignment ratios need adjusting determines the assignment ratios do not need adjusting, the transmission step transmits the second chunk according to the assignment ratios for the first chunk.

17. The heterogeneous network transmission method of claim 10, wherein the calculation step calculates a weight value according to a predetermination weight, accumulates all weight values of the heterogeneous network paths, and determines the heterogeneous network path priorities according to the accumulated weight values.

18. The heterogeneous network transmission method of claim 10, wherein the assignment ratios are in direct proportion with the accumulated weight values.

19. A computer readable medium storing a computer program to execute a heterogeneous network transmission method for transmitting a packet, the method comprising the following steps:

detecting a plurality of heterogeneous network path status parameters;

calculating a plurality of heterogeneous network path priorities according to the heterogeneous network path status parameters;

determining a plurality of assignment ratios according to the heterogeneous network path priorities; and transmitting a first chunk of the packet according to the assignment ratios.

20. The computer readable medium of claim 19, further comprising the step of determining a category of the packet according to one of a source port and a protocol identification of the packet.

21. The computer readable medium of claim 19, wherein the detection step re-detects the heterogeneous network path status parameters when a second chunk of the packet is processed, the method further comprising the following steps:

determining whether the assignment ratio needs adjusting; and deciding an adjustment type of the packet if the assignment ratio needs to be adjusting.

22. The computer readable medium of claim 21, wherein the step of determining whether the assignment ratios need adjusting determines whether the assignment ratios need adjusting according to the heterogeneous network path status parameters detected for the first chunk and the second chunk.

23. The computer readable medium of claim 21, wherein if the adjustment type is a coarse type, the calculation step re-calculates the heterogeneous network path priorities according to the heterogeneous network path status parameters detected for the second chunk, the assignment step re-determines the assignment ratios according to the re-calculated heterogeneous network path priorities, and the transmission step transmits the second chunk according to the re-determined assignment ratios.

24. The computer readable medium of claim 21, wherein if the adjustment type is a slight type, the calculation step re-calculates the heterogeneous network path priorities according to the heterogeneous network path status parameters, the assignment step re-determines the assignment ratios according to the re-calculated heterogeneous network path priorities, and the transmission step transmits the second chunk according to the re-determined assignment ratios.

25. The computer readable medium of claim 21, wherein if the step of determining whether the assignment ratios need adjusting determines the assignment ratios do not need adjusting, the transmission step transmits the second chunk according to the assignment ratios for the first chunk.

26. The computer readable medium of claim 19, wherein the calculation step calculates a weight value according to a predetermination weight, accumulates all weight values of the heterogeneous network paths, and determines the heterogeneous network path priorities according to the accumulated weight values.

27. The computer readable medium of claim 19, wherein the assignment ratios are in direct proportion with the accumulated weight values.

* * * * *